Patented June 6, 1933

1,913,100

UNITED STATES PATENT OFFICE

CLARENCE W. BALKE, OF HIGHLAND PARK, ILLINOIS, ASSIGNOR, BY MESNE ASSIGNMENTS, TO RAMET CORPORATION OF AMERICA, OF CHICAGO, ILLINOIS, A CORPORATION OF ILLINOIS

METHOD OF MAKING HARD ALLOYS

No Drawing.   Application filed October 11, 1930.   Serial No. 488,177.

This invention relates in general to alloys and has more particular reference to very hard alloys for use primarily in the formation of metal cutting or working tools and to a method of making tools from such alloys.

A primary object of the invention is the provision and production of a tool portion which is non-porous, extremely hard, tough, and durable and which can be readily secured to a tool portion of ordinary metal without requiring overheating the first mentioned tool portion.

An important object of the invention is the provision and production of a non-porous tool working portion made from an extremely hard and tough alloy which is sufficiently strong to overcome chipping or crumbling when assembled in a tool.

Another important object of the present invention is to so treat a mixture of the powdered constituents of the alloy for the novel tool portion as to keep them free from gaseous impurities.

A further important object of the invention is the provision of refractory metal carbide tool portion which may be securely attached to a tool body or shank of an ordinary metal.

Still another important object of the invention is to introduce a desirable metallic constituent into a composition of a refractory metal and a metalloid by erosion or wear of apparatus used in making the tool portion and so uniting the composition and the added metallic constituent as to provide a non-porous alloy suitable for use in the formation of tools so tough and strong as to obviate frequent grinding.

Other objects and advantages will appear more fully from the following description.

Refractory metal compositions or alloys such as are suitable for use in the formation of metal working or cutting tools usually have very low thermal coefficients of expansion and are weak compared to the more ductile or ordinary metals. It is, therefore, exceedingly difficult to solder, braze, or weld tool portions made from such alloys to tool bodies or shanks of ordinary metals without cracking the refractory portions. Moreover, such tool portions frequently crack at high temperatures. It is desirable therefore to produce such a hard alloy which, when formed as a working portion of a tool, may be attached to a tool body or shank of ordinary metal by means of a low melting point metal, solder, or brazing compound.

Low melting point attaching metals or compounds, however, may soften or melt at the temperatures developed by the friction between the tool and the chips. Moreover, refractory metals or alloys thereof resist wetting by the usual soldering or attaching metals or compounds. It is here contemplated, therefore, to provide such a tool portion which will have a coefficient of thermal conductivity sufficiently low to permit the use of a low melting point attaching composition and which can be treated so as to be wet by such an attaching composition.

Briefly, I overcome the foregoing objections by uniting a refractory metal powder such as tantalum, columbium, or tungsten powder or suitable mixtures thereof with a metalloid such as carbon or boron. To this composition an auxiliary metal is added which has a fusing or sintering temperature below the melting point of the boride or carbide and which will alloy with the refractory metal of the carbide or boride at a relatively low temperature. This auxiliary metal is added to the carbide or boride in the presence of a low-boiling point hydrocarbon to exclude gaseous impurities. The mixture is then dried and heated in a reducing atmosphere to degasify it, after which the mixture is formed to the desired size and shape and heat-treated to form a tool portion which is thereafter attached to a tool body or shank.

It will, of course be understood that the oxides of the refractory metals are here contemplated as coming within the scope of the present invention. The refractory metal oxides may be previously reduced in a known manner or united with boron and/or sufficient carbon to reduce the oxides whereby to form the boride or to leave enough carbon to form the desired carbide.

In carrying out the invention to accomplish the above mentioned objects, I preferably use carbon in the form of lamp black or charcoal which has been pre-heated in a closed graphite crucible to about 1500 degrees C. to volatilize any organic matter contained by the carbon and to rid it of objectionable gases.

After such purification of the carbon it is mixed with a refractory metal powder such as tantalum powder in about the proportion of from 5% to 6.2% by weight of carbon, and 95% to 93.8% by weight of tantalum, the mixing being carried out in a graphite crucible packed in lamp black. This mixture of tantalum and carbon is then placed in a high frequency furnace and united by slowly raising the temperature to about 2000 degrees C. and maintaining this temperature for about one half hour to degasify the mixture and to chemically combine the powders.

This step of the novel method is usually accompanied by a violent reaction. The tantalum carbon composition that results is a tantalum carbide having from 5% to 6.2% by weight of carbon which is next ground in a ball mill for about twenty four hours to a finely divided powder. After grinding the carbide it is again heated preferably in a tantalum vessel to about 2000 degrees C. in a vacuum furnace, to completely degasify the mixture, and to complete the reaction between the refractory metal and the carbon.

This treatment of a carbide powder may be carried out by subjecting the powder to a sufficient pressure to hold the particles together under the action of the vacuum pump and serves to completely reduce whatever oxides may be present in the carbide and to reduce air spaces among the particles of the powder. The carbide is then ready for mixing and uniting with an auxiliary metal for producing a homogeneous alloy.

While the foregoing description deals with the production of a refractory metal carbide it will be understood that the invention contemplates the provision or production of either the boride or carbide and when provided as described above, the refractory metal compositions are relatively free from gaseous impurities but require another metal which may be any auxiliary metal having a fusing or sintering temperature below the melting point of the boride or carbide and which will alloy with the refractory metal at a comparatively low temperature.

It is important that the auxiliary metal be added to the refractory metal carbide in such a manner that gaseous impurities such as oxygen are excluded, because such gaseous impurities cause porosity in the final alloy. Preferably I employ one or more metals of the iron group such as iron, nickel, or cobalt in the proportion of from 3% to 15% by weight of such metal of the iron group to form 97% to 85% by weight of the tantalum carbide. This proportion of the auxiliary metal may be added to the tantalum carbide powder in powder form and the mixed powders reduced to an extremely finely divided powder in a ball mill. In order, however, to guard against the oxidation of the finely divided auxiliary metal whereby to reduce porosity in the final alloy, I prefer to introduce the auxiliary metal by the process of erosion or wear. Consequently, I introduce the tantalum carbide into a ball mill having balls of the desired auxiliary metal and soak the carbide powder with any low boiling point hydrocarbon such as naphtha or high test gasolene, which readily volatilizes.

In grinding this carbide the carbide powder erodes or wears away metal from the balls of the mill, and the naphtha prevents the oxidation of the constituents of the alloy by forming a light film about the powder particles. The length of time of grinding required to provide from 3% to 15% by weight of, for example, nickel in the mixture is determined by the quantity of carbide being ground and the percentage of nickel desired in the alloy. Usually, however, from 48 to 90 hours of grinding is sufficient time in which to introduce the required amount of the auxiliary metal. Thus by a usual step in the method of producing the alloy, the required amount of one of the constituents is added in such a manner as to exclude gaseous impurities.

This naphtha soaked mixture of tantalum carbide and, for example, nickel is next removed from the ball mill and dried by any suitable means such as in a steam bath or in air. The dried powder is further degasified by heating it in a reducing atmosphere such as hydrogen at a low red heat. The mixture is then subjected to a pressure sufficient to press the powder mixture into a body which may be handled and formed or worked to the desired size and shape, and when so formed it is heated in a vacuum at from 1350 degrees to 1400 degrees C., which temperature is maintained for about one hour to unite the tantalum carbide and the auxiliary metal. The resulting alloy is substantially non-porous due to the precautions of purifying the carbon, degasifying the carbide, so introducing the nickel as to exclude oxygen, degasifying the mixture of tantalum, carbide and nickel, and to the final heat treatment in vacuum. These bodies have a homogeneous and substantially non-porous structure and when formed in accordance with the novel method of the invention, retain their hardness, mechanical strength, and toughness or resistance to crumbling or breakage even at the temperatures developed in their use as cutting tools.

Illustrative of the advantages of this improved method it was found that a nickel tantalum carbide tool portion formed as described above is harder and tougher than the same alloy formed by the methods known in the art, and that in taking a heavy cut on a hard manganese steel, the cutting portion or bit had sufficient mechanical strength to resist the reaction of the feed, was sufficiently hard to resist appreciable wear, and did not break, chip or crumble. It was also found that these bodies when employed in metal cutting or working tools did not heat so readily as other tools in making the cut, and apparently offered a minimum resistance to the relative movement of the material being cut.

I have found that these cutting or working portions may be securely attached to tool bodies of ordinary metals by coating them with molten metal having a coefficient of expansion more nearly equal to that of the tool body, or by electro-plating the cutting portion and soldering it to the tool body or shank by means of a low melting point solder.

The cutting portion of tantalum, nickel and carbon is first treated so that it may be wet or coated by a metal or alloy having a thermal coefficient of expansion substantially equal to that of the ordinary metal to which the coating portion is to be attached, and then coated with such a metal by chemical or electro-chemical means. If desired the tool body or shank of an ordinary metal may also be coated with the same metal with which the cutting portion is plated and the cutting portion soldered, brazed or welded to the tool body or shank in any suitable manner.

By carefully preheating the cutting portion or the refractory metal alloy before it is subjected to the temperatures required in the plating or coating step mentioned above, the temperature of the cutting portion is not changed so suddenly as to cause cracking or checking, and when the cutting portion is so mounted it does not break away or recede from the work. A tool so made, therefore, is particularly well adapted for accurate work and heavy duty.

Without advancing any theory explaining the reason or reasons that a tool portion formed as described above has a low coefficient of thermal conductivity, I have found that when such a tool is used to cut relatively hard metals, the heat generated by the friction between the tool and the work is not sufficient to melt a relatively low melting point metal, soldering or brazing compound. I am, therefore, enabled to employ soldering or brazing compounds of relatively low melting point between the cutting portion and the tool body or shank whereby to securely attach the cutting portion to the shank or tool body without the danger of this attaching layer of metal melting or becoming soft due to the heat generated in using the tool. Frequently in such tools the soldering or brazing material becomes soft during the use of a tool in cutting metals and the soldering or brazing compound flows or is exuded outwardly from between the cutting portion and the tool shank or body, and when the cutting has ceased, this softened brazing or soldering compound hardens and is ground away upon the grinding of the tool, leaving a void between the tool shank and the cutting portion. At the next cutting operation with the tool the pressure exerted by the work on the cutting portion is frequently sufficient to break or crack the tool due to the bending stresses transmitted to the tool from the work. By making the tool as herein described, I have succeeded in overcoming the foregoing defects and am enabled to employ a low melting point brazing, soldering or welding compound for securing or attaching the cutting portion to the tool body or shank.

Having thus described my invention, what I claim as new and desire to secure by Letters Patent of the United States is:

1. A method of producing a hard alloy of tantalum carbide and nickel which comprises grinding tantalum carbide by means of nickel grinders thereby adding nickel to said tantalum carbide and uniting said tantalum carbide and the nickel erosively added to the carbide by the operation of the grinder by means of pressure and heat.

2. A method of producing a non-porous alloy which comprises introducing tantalum carbide and a readily volatilizable hydrocarbon in a grinder having metal grinding elements for grinding said carbide, erosively adding some of the metal of the grinding elements to the tantalum carbide by grinding said carbide, volatilizing said hydrocarbon out of the mixture thus formed, and heating the mixture to from 1350° C. to 1400° C. in a vacuum.

3. A method of producing a hard alloy which comprises grinding tantalum carbide by means of nickel grinders erosively adding nickel taken from said grinders to the tantalum carbide while it is being ground, pressing the ground metals into a body and heating the body in a vacuum to a temperature slightly less than the melting point of nickel.

4. A method of producing a hard alloy which comprises soaking tantalum carbide powder with naphtha, grinding said soaked carbide powder by means of nickel grinders, drying the soaked powder, and alloying it with nickel erosively taken from the nickel grinders during the grinding operation.

5. In the manufacture of hard and tough alloys of a hard refractory metal carbide and a metal of the iron group, the step of grinding tantalum carbide and nickel in the presence of naptha to prevent the oxidation of the tantalum carbide and nickel.

6. In the manufacture of hard and tough alloys of a hard refractory metal carbide and a metal of the iron group, the step of grinding relatively fine particles of tantalum carbide with less finely divided nickel whereby nickel is erosively added to the relatively finely divided tantalum carbide.

7. In the manufacture of substantially imporous alloys of hard refractory metal carbides and a metal of the iron group from powders of the same, the method of substantially eliminating gases tending to produce porosity, which comprises degasifying tantalum carbide powder and nickel powder, and grinding said powders together in the presence of naptha.

8. A method of making alloys which comprises introducing tantalum carbide powder with naptha into a grinder having nickel grinding elements, grinding said tantalum carbide powder in the presence of said naptha whereby nickel from said grinding elements is erosively added to said tantalum carbide, and heating the mixture of tantalum carbide and nickel to above 1350° C. but below the melting point of said nickel.

9. In a method of making tool alloys from the powders of a hard refractory metal carbide, such as a carbide of tantalum, tungsten, columbium, or mixtures thereof and a metal of the group including nickel, grinding the hard refractory metal carbide in relatively finely divided form by means of grinders of the metal of the group including nickel whereby said metal is erosively taken from said grinders and added to said hard refractory carbide, and heating the mixture thus formed to a temperature of the same order as the melting temperature of said metal of the group including nickel.

10. In the manufacture of substantially imporous alloys of a hard refractory metal carbide, such as a carbide of tantalum, tungsten, columbium, or mixtures thereof, and a metal of the iron group from powders of the same, the method of substantially eliminating gases, tending to produce porosity, before combining the powders in vacuo at substantially 1350° C., which comprises grinding together degasified powders of the refractory metal carbide and nickel in the presence of naphtha, drying said powders to remove said naphtha, and degasifying said powders by heating in a reducing atmosphere to a low red heat.

In witness whereof, I hereunto subscribe my name this 7th day of October 1930.

CLARENCE W. BALKE.